Dec. 20, 1966 H. T. STEVINSON 3,292,756
MAGNETIC CLUTCH
Filed Jan. 25, 1965
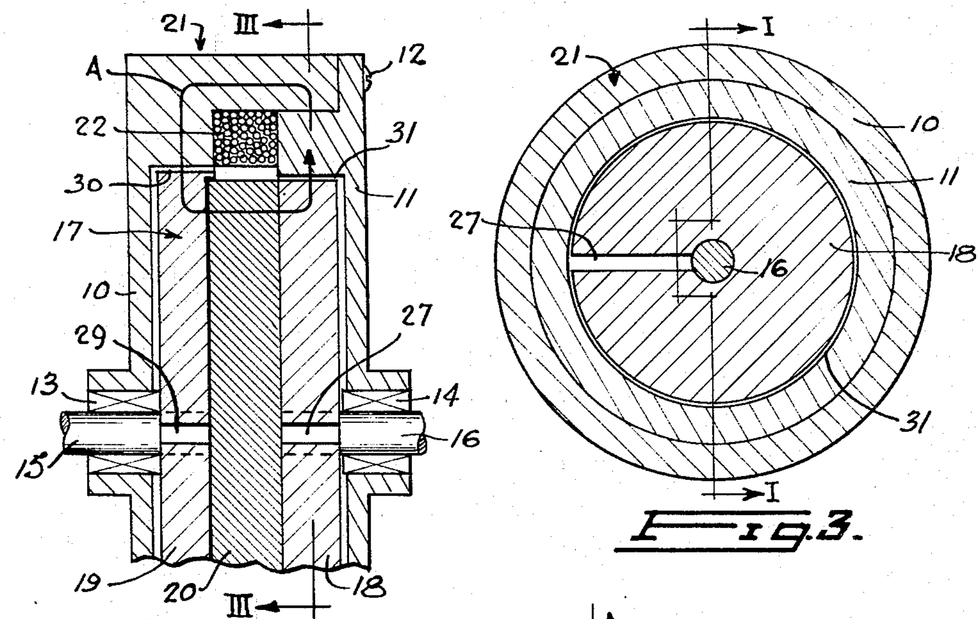
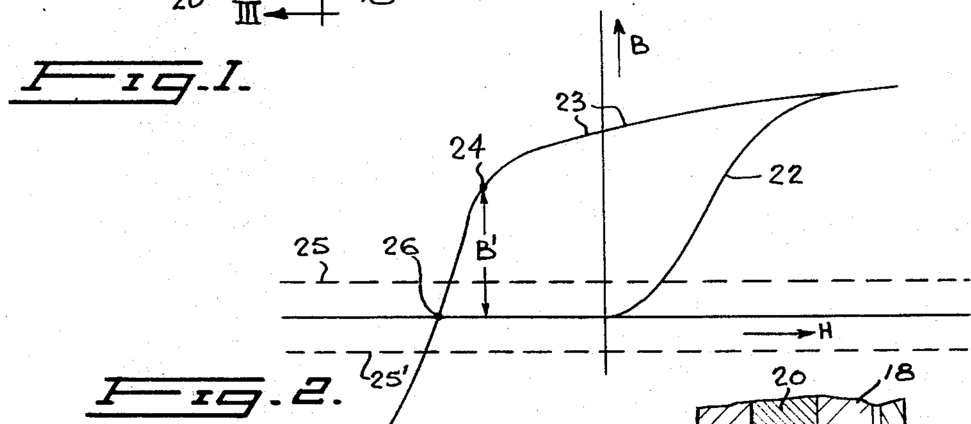
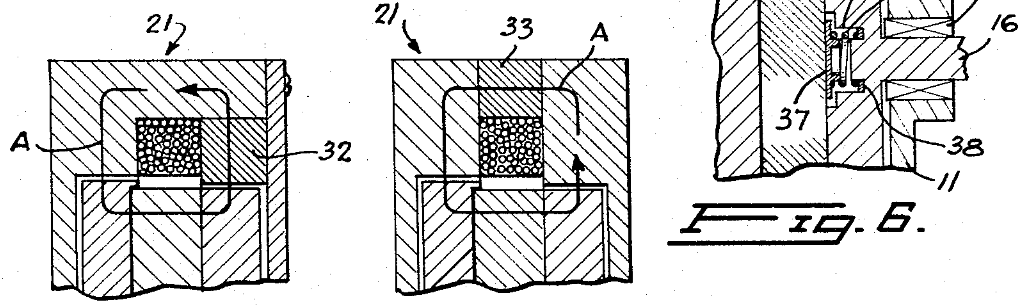
Inventor
Harry T. Stevinson
By Stevens, Davis, Miller & Mosher
Attorneys 3,292,756
Patented Dec. 20, 1966

3,292,756

MAGNETIC CLUTCH

Harry T. Stevinson, Ottawa, Ontario, Canada, assignor to Canadian Patents and Development Limited, Ottawa, Ontario, Canada, a corporation of Canada Filed Jan. 25, 1965, Ser. No. 427,629
6 Claims. (Cl. 192—84)

This invention relates to a magnetic clutch for the transmission of torque between coaxial driving and driven shafts.

The invention combines certain advantages of an electromagnetic clutch with those of a permanent magnet clutch, while avoiding certain disadvantages of both. More specifically, the invention provides a clutch which has the comparatively high flux density (and consequently the ability to transmit comparatively high torques) that is normally found in electromagnetic clutches. At the same time, the invention avoids two of the disadvantages that are often encountered in electromagnetic clutches. Firstly, it does not require a continuous current supply. Secondly, it does not require that the current be led into the rotating parts; the complications of slip rings and the like are thus avoided.

This object is achieved by a magnetic clutch comprising:

(a) A fixed structure including an annular assembly of magnetic material, (b) A pair of rotary elements of magnetic material having respective clutch faces for mutual engagement, (c) Means mounting said rotary elements for coaxial rotation within said annular assembly with said assembly closely surrounding said elements to form a toroidal magnetic circuit extending from the annular assembly and successively through said rotary elements back to said annular assembly, and (d) A permanently magnetizable element including an annular portion extending across the entire width of said magnetic circuit, (e) Said annular assembly including electric winding means for pulsing said magnetic circuit selectively to energize said permanently magnetizable element to hold said faces together for the transmission of torque therebetween and to de-energize said permanently magnetizable element to release said faces.

Examples of the clutches constructed in accordance with the present invention are illustrated diagrammatically in the accompanying drawings. It is to be understood that these drawings are provided by way of example only and not by way of limitation, the scope of the invention being defined by the appended claims.

In the drawings:

FIGURE 1 is a partial central cross-section (taken on the line I—I of FIGURE 3) of a first form of clutch constructed in accordance with the present invention;

FIGURE 2 is a flux diagram;

FIGURE 3 is a section on III—III in FIGURE 1; and

FIGURES 4, 5 and 6 are fragmentary views respectively showing modifications to the clutch of FIGURE 1.

The clutch shown in FIGURES 1 and 3 has a fixed structure consisting of a pair of annular members 10 and 11 joined together by bolts 12. Members 10 and 11 respectively support bearings 13 and 14 which respectively journal a drive shaft 15 and a coaxial driven shaft 16. The drive shaft 15 carries at its end a rotary element 17 of magnetic material, and the shaft 16 similarly carries a rotary element 18 also of magnetic material. The rotary element 17 is a complex, being constructed of a first disc 19 of soft iron and a second disc 20 of a convenient permanently magnetizable material, preferably Alnico 5. The discs 19 and 20 are permanently connected together by a magnetic glue, such as a composition containing 80% of iron filings in an epoxy resin. The radially outermost portions of the members 10 and 11 form an annular assembly 21 which closely surrounds the rotary elements. An annular electric winding 22 completes the device.

When the winding 22 is pulsed momentarily by a relatively intense electric current, a strong magnetic flux is set up in the circuit illustrated by the arrow A. This magnetic circuit is toroidal in form, that is in length, and, at each location along its length it extends from the fixed annular assembly 21 and successively through the discs 19, 20 and 18 and back to the annular assembly 21. This magnetic circuit is all soft iron except for the part represented by the permanently magnetizable disc 20, the outer annular portion of which extends across the entire width of the magnetic circuit. In other words all the flux (disregarding leakage) must flow through the disc 20. The result of energization of the permanently magnetizable disc 20 in this way is illustrated in FIGURE 2, which shows a plot of H, the magnetizing force in oersteds, against B, the flux density around the magnetic circuit in kilogauss. The physical pressure P exerted between the mutually engaging clutch faces of the relatively rotatable rotary elements 17 and 18 is proportional to $B^2$. This pressure multiplied by the coefficient of friction between the interfaces, and the radius of action about the shaft axis, gives the contribution of each unit of interface area towards the total torque that may be transmitted.

If the winding 22 is pulsed in a first direction, the magnetic characteristics can be assumed to follow portion 22 of the hysteresis curve. At the end of the pulse, which may be as short, for example, as one millisecond, the magnetic circuit conditions will return along the line 23 because of the permanently magnetizable properties of the Alnico 5 which forms the disc 20. Depending mainly upon the total length of air gap in the magnetic circuit, the system will reach a position, such as has been typically represented by the point 24. The distance of the point 24 back along the curve 23 from the ordinate is determined by the total demagnetizing effect of the air gaps. There will in fact be three air gaps in the system, an axial air gap (not visible) between the engaging faces of the discs 18 and 20, and two radial (circumferentially extending) air gaps 30 and 31, between the annular assembly 21 and the respective discs 19 and 18. These air gaps will be made to have a uniform and constant low value, a result achieved by working to close tolerances during manufacture. The length of the magnetic path through the Alnico 5 disc 20 and the total air gap will be designed to cause the magnetic circuit to remain, after energization of the disc 20 by the winding 22, at a point such as 24 which is advantageous. The most desired position for the point 24 on the curve 23 is the location giving the maximum value for the product BH. Alnico 5 is the preferred permanently magnetizable material because it is relatively inexpensive and yields a large maximum value for the product BH. Alternatively, the platinum cobalt alloy made of 76.7% Pt and 23.3% Co can be used, where the expense is justified, such alloy having a maximum BH of almost twice that of Alnico 5.

With the clutch thus energized and the magnetic circuit in the condition represented by the point 24, a substantial flux density B′ remains and the physical force is relatively large. The clutch can therefore be employed for the transmission of significant amounts of power. The clutch will remain thus "engaged" without need for a continuously supply of current to hold it in operation.

When it is desired to release the clutch, the winding 22 is pulsed in the reverse direction by an electric current of suitable value and this will cause the magnetic condition to move further to the left and downwardly on the curve 23. The line 25 represents the minimum value for B that will hold the clutch engaged (for a given torque to be transmitted). As soon as conditions fall below the line 25, the clutch will slip. Accurate control of the intensity of the releasing pulse can theoretically bring the magnetic circuit to rest at the ideal point 26 at which B equals zero. In practice, it is unnecessary to operate with such precision. Any location on the curve 23 between the slip threshold lines 25 and 25′ will produce a slipping clutch, the line 25′ representing the minimum value of B needed for re-energization of the clutch with the flux in the opposite sense.

Any location on the curve 23 between lines 25 and 25′ will allow the clutch to slip. The clutch can be made to disengage completely by the addition of a spring 36 (FIGURE 6) tending to push apart the rotary discs 20 and 18. This spring 36 is housed in a cavity 35 in the disc 18, and bears on washers 37 and 38. It is illustrated merely as a diagrammatic representation of the principle. Other forms of spring may be used. In practice, once the clutch has begun to disengage, the air gap between the discs 18 and 20 will tend to be slightly increased, which will have the effect of further demagnetizing the system, and of increasing the pulse necessary for re-engagement of the clutch. The presence of the spring reduces the pressure between the discs 20 and 18, but in return ensures that these discs separate as soon as the magnetic forces drops below the value corresponding to the spring strength. Thus a smaller release pulse can be used. Moreover, the more positive introduction of an air gap into the magnetic circuit allows successful release with a wide range of release pulse strengths. For example, if the release pulse were by chance too strong it would be less likely to effect re-engagement by remagnetizing in the reverse direction. The tolerance to variation of release pulse amplitude could be adjusted by change of the release-spring strength. The penalty for this tolerance is a demand for a greater engaging pulse which would have to overcome the air gap reluctance and pull the discs 20 and 18 together. To minimize losses from eddy currents, a radially extending slot can be cut in each of the rotating discs 18 and 19. Such slots have been shown at 27 and 29 in FIGURE 1, their typical shape being shown by the slot 27 in FIGURE 3. A similar slot could be cut in the permanently magnetizable disc 20, but normally the material of this disc will be harder to machine and, in any event, the need will be far less important, since the electrical conductivity of the permanently magnetizable material will be such less than that of the soft iron of the discs 18 and 19.

Another method of minimizing eddy currents is to use ferrite materials, that is to say, magnetic materials which are electrically nonconducting. A soft ferrite would be used to replace the soft iron, and, if desired, a permanent ferrite, such as the material known as Magnadur, could be used to replace the Alnico 5, although at the expense of inferior magnetic properties (i.e. a substantially smaller maximum value of BH). Alternatively, the soft iron parts can be retained and be laminated.

It is not essential that the permanently magnetizable element form part of one of the rotary elements, as it does in FIGURE 1. It can, alternatively, form part of the fixed annular assembly 21. FIGURE 4 shows one construction in which a ring of permanently magnetizable material 32 has been placed at the side of the annular assembly 21, and FIGURE 5 shows an alternative construction in which a similar ring 33 of permanently magnetizable material has been placed at the centre of the annular assembly 21. It will be appreciated that, in all instances, the permanently magnetizable element must extend, or must at least include an annular portion which extends across the entire width of the magnetic circuit, that is, across the full width of the circuit, in both the directions transverse to the arrow A. In FIGURES 1 and 5 these are the radial and circumferential directions; in FIGURE 4 these are the axial and circumferential directions. If this were not so, there would be a magnetic shunt of soft iron around the permanently magnetizable element and it would not become effectively magnetized during pulsing.

It will be appreciated that the clutch described herein has the advantages mentioned above. A clutch is provided which has a performance comparable to that of an electromagnetic clutch, but without the need either to have a continuous current supply or to feed a current supply into the rotating parts.

It will also be appreciated that very large current densities can be used in this device, even beyond the values that would fuse the wires in a conventional electromagnet. This is because pulses of large magnitude but very short duration can be used. The thermal capacity of the wire and its surroundings introduces a time delay into the temperature response of the circuit to these current pulses, such that the pulse is over before damaging temperatures have been reached. This factor can be exploited to yield savings in space, weight and first cost of such devices, in addition to those savings already mentioned due to removal of the need to supply constant power to the device during either its engaged or disengaged phase.

I claim:

1. A magnetic clutch comprising
   (a) a fixed structure including an annular assembly of magnetic material,
   (b) a pair of rotary elements of magnetic material having respective clutch faces for mutual engagement,
   (c) means mounting said rotary elements for coaxial rotation within said annular assembly with said assembly closely surrounding said elements to form a toroidal magnetic circuit extending from the annular assembly and successively through said rotary elements back to said annular assembly,
   (d) and a permanently magnetizable element including an annular portion extending across the entire width of said magnetic circuit,
   (e) said annular assembly including electric winding means for pulsing said magnetic circuit selectively to energize said permanently magnetizable element to hold said faces together for the transmission of torque therebetween and to de-energize said permanently magnetizable element to release said faces.

2. A clutch according to claim 1, wherein said permanently magnetizable element comprises a part of said annular assembly.

3. A clutch according to claim 1, wherein said permanently magnetizable element comprises a part of one of said rotary elements.

4. A magnetic clutch comprising
   (a) a fixed structure including an annular assembly of magnetic material, said annular assembly being U-shaped in cross section, with the arms of the U projecting radially inwardly towards the axis of said assembly,
   (b) a pair of rotary disc elements of magnetic material,
   (c) a permanently magnetizable disc element secured to a face of one of said rotary elements, said permanently magnetizable disc element and said other rotary element having respective clutch faces for mutual engagement,
   (d) means mounting the three rotary disc elements for coaxial rotation within said annular assembly, said arms of the annular assembly lying immediately radially outwardly of a respective one of said pair of rotary disc elements with small air gaps therebetween to form a toroidal magnetic circuit extending from the annular assembly and successively through a first of said pair of rotary disc elements, the permanently magnetizable element and the other of said pair of rotary disc elements back to said annular assembly, (e) said annular assembly including an electric winding extending annularly around said assembly between the arms thereof for pulsing said magnetic circuit selectively to energize said permanently magnetizable element to hold said clutch faces together for the transmission of torque therebetween and to de-energize said permanently magnetizable element to release said clutch faces.

5. A clutch according to claim 1, including spring means urging said rotary elements apart.

6. A clutch according to claim 4, including spring means urging said clutch faces apart.

References Cited by the Examiner

UNITED STATES PATENTS

| | | | |
|---|---|---|---|
| 2,147,204 | 2/1939 | Laird. | |
| 2,575,360 | 11/1951 | Rabinow | 192—84 X |
| 2,612,248 | 9/1952 | Feiertag. | |
| 2,650,684 | 9/1953 | English et al. | 192—21.5 |
| 2,919,775 | 1/1960 | Wiedmann et al. | 192—84 |
| 2,956,658 | 10/1960 | Jaeschke | 192—84 |
| 3,089,064 | 5/1963 | Bennetot | 317—172 X |
| 3,136,144 | 6/1964 | Weiss | 192—84 X |

DAVID J. WILLIAMOWSKY, *Primary Examiner.*

A. T. McKEON, *Assistant Examiner.*